United States Patent [19]

Martin

[11] 4,024,917

[45] * May 24, 1977

[54] CALCIUM AND MAGNESIUM HYDROXIDE PLUGGING PROCESS

[76] Inventor: Waylan C. Martin, P.O. Box 1468, Monahans, Tex. 79756

[ * ] Notice: The portion of the term of this patent subsequent to Sept. 24, 1991, has been disclaimed.

[22] Filed: Jan. 28, 1974

[21] Appl. No.: 437,511

Related U.S. Application Data

[63] Continuation-in-part of Ser. No. 315,655, Dec. 15, 1972, Pat. No. 3,837,400.

[52] U.S. Cl. .............................................. 166/292
[51] Int. Cl.² ................ E21B 43/12; E21B 33/138
[58] Field of Search .......... 166/270, 273, 274, 292, 166/300

[56] References Cited

UNITED STATES PATENTS

| | | | |
|---|---|---|---|
| 2,042,011 | 5/1936 | Loomis | 166/292 |
| 2,156,220 | 4/1939 | Dunn | 166/292 |
| 2,238,930 | 4/1941 | Chamberlain et al. | 166/292 |
| 2,272,672 | 2/1942 | Kennedy | 166/270 |
| 2,747,670 | 5/1956 | King et al. | 166/270 |
| 2,837,163 | 6/1958 | Ramos et al. | 166/270 |
| 3,185,214 | 5/1965 | Bernard et al. | 166/270 |
| 3,342,262 | 9/1967 | King et al. | 166/300 |
| 3,396,790 | 8/1968 | Eaton | 166/270 |
| 3,414,053 | 12/1968 | Treiber et al. | 166/300 |
| 3,530,937 | 9/1970 | Bernard | 166/270 |
| 3,658,131 | 4/1972 | Biles | 166/292 |
| 3,837,400 | 9/1974 | Martin | 166/274 |

Primary Examiner—Ernest R. Purser
Attorney, Agent, or Firm—Wendell Coffee

[57] ABSTRACT

Channels in a water flood oil zone are plugged by injection of a hydroxide solution such as sodium hydroxide. The hydroxide solution is isolated from the connate water in the wellbore and vicinity of the wellbore by an isolation slug of water low in metallic ions which would react with the sodium hydroxide. Away from the wellbore where the isolation slug of water breaks down, the sodium hydroxide reacts with different metallic ions in the connate water such as magnesium and calcium to form precipitates of low solubility which will plug the water channels.

6 Claims, 3 Drawing Figures

U.S. Patent    May 24, 1977    4,024,917
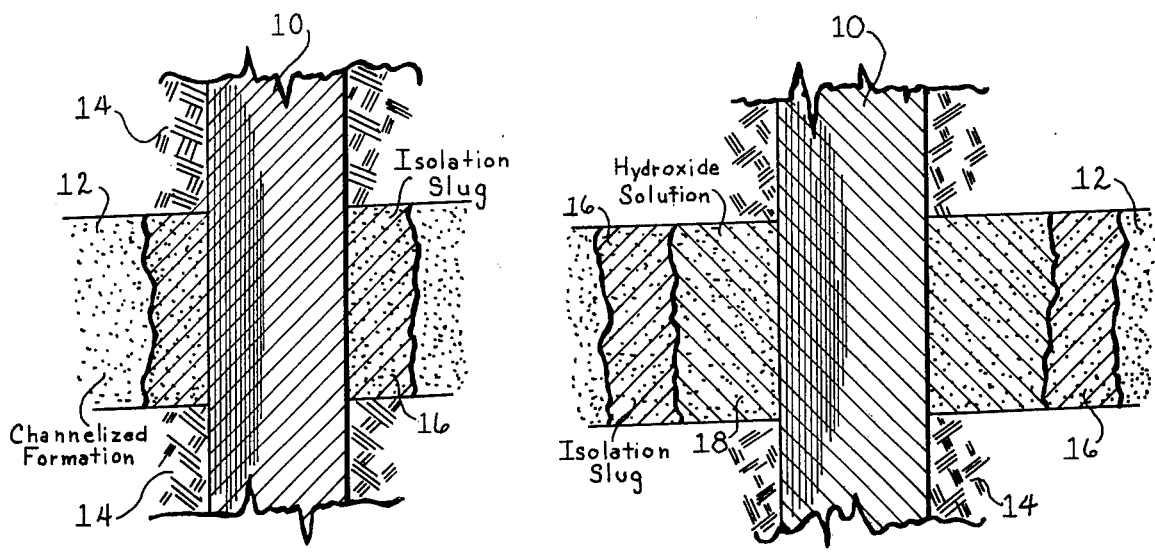
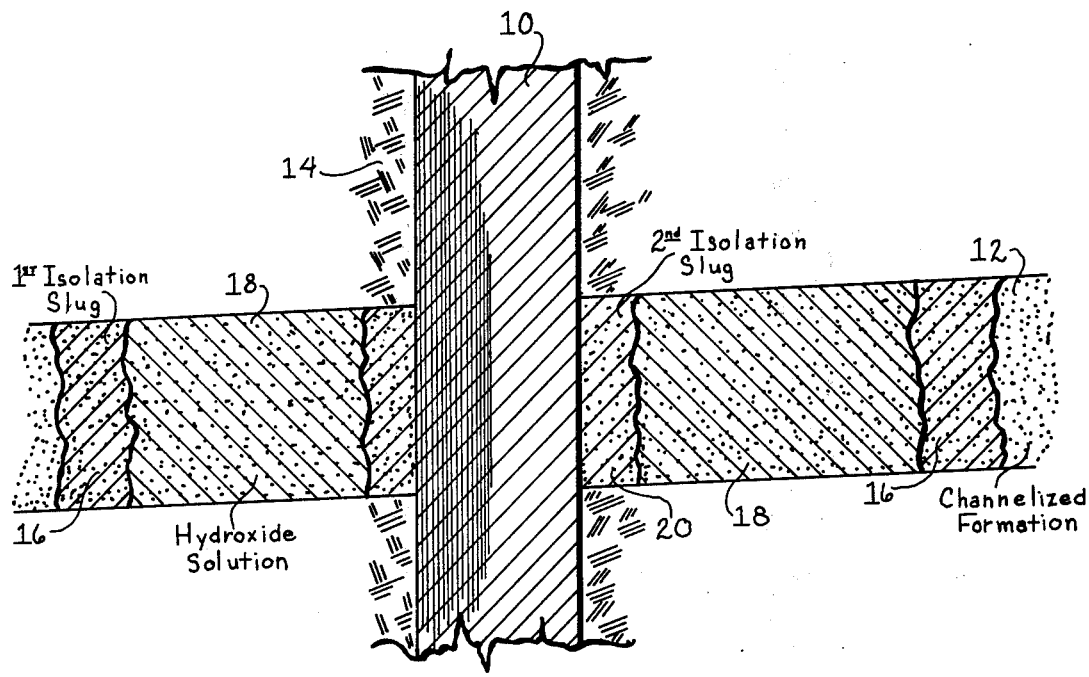

CALCIUM AND MAGNESIUM HYDROXIDE PLUGGING PROCESS

CROSS-REFERENCE TO RELATED APPLICATIONS

This application is a continuation-in-part of my prior application Ser. No. 315,655 now U.S. Pat. No. 3,837,400 filed Dec. 15, 1972.

BACKGROUND OF THE INVENTION

1. Field of the Invention

This invention relates to water flood oil wells and more particularly to introducing a material to chemically interact with metallic ions in water in the formation to produce a plugging precipitate in situ.

2. Description of the Prior Art

Water flooding in oil field production is a well known process.

When a producing oil well is first drilled, generally, there will be sufficient excess of petroleum to flow into the well where it can be brought to the surface by existing pressure within the well or by pumps. After a certain length of production, the petroleum no longer flows into the producing well. Additional oil can be produced from the zone by water flood process.

Basically the water flood process is: water is injected into the zone in one well and then the water pushes the oil through the zone to another well from which the oil is pumped to the surface.

During this process, channelization may occur. The water, instead of flooding the entire formation, may form channels through the zone and go almost directly from the injection well to the producing well so mostly water is pumped from the producing well instead of oil. In such case, small amounts of oil are produced and excess expense is incurred in pumping excess water.

Many oil bearing formations include connate water, which is that water which is born with the formation or water which originated with the formation. In most instances, connate water is derived from sea water held in the interstices of sedimentary deposits and sealed therein. This connate water has metallic ions therein which would normally include magnesium ions and calcium ions. This would sometimes be expressed: the water has soluble calcium and magnesium salts of chlorides, sulfates, and bicarbonates.

Previous workers in the field have sought to form precipitates within underground formations by injecting a sodium hydroxide solution and then injecting a spacer slug of water and finally injecting a second material such as ferric chloride. Others have used aluminum salts to precipitate aluminum hydroxide when using a hydroxide.

According to the best of my knowledge, no previous worker has depended upon the reaction with the connate water.

The following U.S. Pat. Nos. were considered in preparing this application:

Loomis 2,042,011, Dunn 2,156,220, Kennedy 2,272,672, Chamberlain 2,238,930, King 2,807,324, King 2,747,670, Ramos et al 2,837,163, Bernard et al 3,185,214, Eaton 3,396,790, King et al 3,342,262, Bernard 3,530,937.

SUMMARY OF THE INVENTION

1. New and Different Function

I have discovered that it is profitable to plug channels within the formation by using the connate water. Therefore, according to my process, an isolating slug of water containing practically no magnesium or calcium ions is first injected into the injection well. Then a considerable quantity of sodium hydroxide is injected. The sodium hydroxide will not contact the connate water until it has penetrated the isolation slug of water. The contact will be some distance from the wellbore and, therefore, there will be no plugging precipitate in the wellbore or in the immediate vicinity of the injection bore. However, thereafter, the injected sodium hydroxide will mix with the connate water to form precipitates, which precipitates form along the normal fluid-carrying channels. The precipitates will be in the form of magnesium hydroxide, calcium hydroxide and calcium carbonate.

It is these channels which are desired to be plugged and the precipitate will plug these channels. I.e., where most of the sodium hydroxide solution is carried by the normal flow of water to the water flood zone are the very places desired to be plugged and, therefore, it is where the plugging will occur. There will be little or no plugging in zones not taking water, which is desirable.

Immediately after the sodium hydroxide solution is injected, the water flooding can be resumed if the water used to flood will not form a hydroxide precipitate. However, in many instances, the oil bearing zone is being flooded with a recovered water, i.e., with salt water which was originally in formation and it, itself, will contain magnesium, calcium or other ions which will form an insoluble precipitate. In such an event, it is necessary to inject an additional isolation slug of low metallic ion water after the sodium hydroxide solution has been injected.

This process has been described primarily as being applied to a water flood process. However, it will be understood that this process may also be applied to a producing oil well in the same manner. In this application, the precipitated magnesium or calcium hydroxide and perhaps other precipitated hydroxides will function to prevent the entering of connate water into the wellbore of the producing well that has been treated.

One of the additional benefits of this invention is that the precipitous forms are reactable with acids so if an undesirable plug does form, it could be removed by conventional, well known acid treatment.

In addition to the plugging processes, it is known that sodium hydroxide will clean oil from the formation surfaces and thereby release oil so it flows to the production well.

2. Objects of this Invention

An object of this invention is to increase oil production and reduce accompanying water production from underground formations.

Another object is to plug channels which form in water flooded oil bearing zones.

Other objects are to achieve the above with a method that is versatile, rapid, efficient, inexpensive and does not require complex or complicated machinery nor skilled people to install, adjust, operate, and maintain.

The specific nature of the invention, as well as other objects, uses, and advantages thereof, will clearly appear from the following description and from the accompanying drawing, the different views of which are not necessarily to the same scale.

BRIEF DESCRIPTION OF THE DRAWING

FIG. 1 is a schematic representation of an injection well in an underground zone.

FIG. 2 is a schematic representation of the well and zone of Fig. 1 with the hydroxide solution being injected.

FIG. 3 is a schematic representation of the well and zone after completion of the hydroxide injection.

DESCRIPTION OF THE PREFERRED EMBODIMENT

Referring more particularly to FIG. 1 of the drawing, there may be seen an injection well and, particularly, bore 10 which intersects the oil zone 12 which has been channelized. Normally, the oil bearing zone is between two impervious formations 14.

As the first step in this procedure, as isolation slug 16 of water is injected into the zone. The water used for the isolation slug is low in those metallic ions which form insoluble precipitates. The isolation slug prevents contact between the hydroxide solution and any connate water which might be in the injection well or in the immediate vicinity of the injection well. It is important that the precipitate not form in the injection well or immediately near the injection well or there might be a complete plugging at the injection well. Then, the zone 12 and other zones that are not channelized would no longer take flood water which would defeat the basic purpose.

After an isolation slug 16 of low metallic ion water has been injected, a sodium hydroxide solution 18 is injected. It will be understood that any or many soluble hydroxide solutions could be used, however, sodium hydroxide is preferred. It is preferred because it is readily available, low cost, and, also, because it has a cleaning action, cleaning the oil from the surfaces within the zone 12. It will be noted that as the hydroxide solution 18 is injected, the isolation slug 16 becomes thinner, i.e., the distance across it becomes less. Inasmuch as the water is in a constantly expanding circle in the zone 12, the fixed amount of isolation slug of water becomes thinner and thinner. Of course, it is only a question of time or distance before the isolation plug 16 completely breaks down so the hydroxide solution 18 comes in contact with the metallic ions within the connate water. At that time, an insoluble metallic hydroxide precipitate is formed within the zone 12. It is difficult to determine exactly what precipitates will form. Magnesium hydroxide will certainly be one of them. Depending upon the concentration of magnesium and calcium ions and also the concentration of the hydroxide within the solution, other precipitates such as calcium hydroxide and calcium carbonate will form. Of course, calcium hydroxide is slightly soluble in water, but in the particular environment of this case, I have found that it has very low solubility.

Immediately after the injection of the hydroxide solution 18, it is desirable to immediately resume pumping flood water into the zone.

Normally there will not be sufficient precipitous forming ions in the flood water to cause problems. However, in some cases where there might be more magnesium or calcium in the flood water, there would be an excess of precipitates formed within the wellbore 10 itself. Such precipitates would be pumped out into the zone 12 immediately surrounding the bore where other precipitates would also be formed and completely plug all zones in the wellbore. Then it is desirable to use a second isolation slug 20 of low metallic ion water. Then, immediately behind the second isolation slug 20, the regular flood water is immediately pumped to push the hydroxide solution 18 on through the formation where it reacts with the connate water as described above.

Therefore, it may be seen that I have achieved the objectives of this invention to advantageously plug the channels within an oil producing zone.

The embodiment shown and described above is only exemplary. I do not claim to have invented all the elements or steps described. Various modifications can be made in material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

SUBJECT MATTER CLAIMED FOR PROTECTION

I claim as my invention:

1. In an oil bearing zone which has channelized
   a. said zone containing connate water with
   b. metallic ions which will form a low soluble precipitate therein;
   c. the method of plugging water channels therein comprising the steps of:
   d. injecting an isolation slug of water low in magnesium and calcium, then
   e. injecting an aqueous solution of hydroxide therein, thereby
   f. isolating said hydroxide solution from the connate water near the point of injection and thereafter,
   g. breaking down and penetrating the isolation slug, thus
   h. permitting the mixture of the hydroxide solution and connate water, thus
   j. forming an insoluble metallic hydroxide, thereby
   k. plugging said channels therewith.

2. The invention as defined in claim 1 with an additional limitation of
   j. said hydroxide solution also cleaning oil from the formation in the zone before reacting with said metallic ions.

3. The invention as defined in claim 1 with an additional limitation of
   j. said hydroxide solution being sodium hydroxide.

4. In an oil bearing zone being water flooded which has been channelized
   a. said zone containing connate water with
   b. soluble metallic ions therein,
   c. said metallic ions being those which will form low soluble precipitates;
   d. the method of plugging water channels therein comprising the steps of:
   e. injecting an isolation slug of water low in metallic ions, then
   f. injecting an aqueous solution of hydroxide therein, thereby
   g. isolating said hydroxide solution from the connate water near the point of injection and, thereafter, h. breaking down and penetrating the isolation slug, thus j. permitting the mixture of the hydroxide solution and connate water, thus k. forming insoluble metallic precipitates, thereby m. plugging said channels therewith, n. resuming injection of flood water after injection of the hydroxide solution, and o. isolating said hydroxide solution from the resumed injection of the flood water.

5. The invention as defined in claim 4 with an additional limitation of o. said hydroxide solution being sodium hydroxide.

6. The invention as defined in claim 5 with an additional limitation of p. said hydroxide solution also cleaning oil from the formation in the zone before reacting with said metallic ions.

* * * * *